United States Patent [19]
Tong

[11] 3,997,847
[45] Dec. 14, 1976

[54] DIGITAL DEMODULATOR FOR DIFFERENTIALLY ENCODED PHASE-SHIFT-KEYED DATA

[75] Inventor: Shih Yung Tong, Holmdel, N.J.
[73] Assignee: Bell Telephone Laboratories, Incorporated, Murray Hill, N.J.
[22] Filed: Oct. 29, 1975
[21] Appl. No.: 626,659

[52] U.S. Cl. .............................. 329/105; 178/66 A; 325/349; 329/126
[51] Int. Cl.² ........................................ H03D 3/00
[58] Field of Search .......... 329/104, 105, 110, 126; 325/349; 178/66 A

[56] References Cited
UNITED STATES PATENTS 3,729,684  4/1973  Shuda .................................. 329/104
3,938,052  2/1976  Glasson et al. ..................... 329/104

Primary Examiner—Siegfried H. Grimm
Attorney, Agent, or Firm—Joseph P. Kearns

[57] ABSTRACT

A demodulator for differentially coherent phase-shift keyed data signals correlates samples taken in consecutive baud intervals. Depending on the results of at least two such correlations or lack thereof, counts are registered in unidirectional counters supplied with thresholds related to preassigned counts per baud interval. Bistable circuits respond to the attainment, or failure of attainment, of the threshold-count levels during each baud interval, after which the counters are reset to a reference level. The states of the bistable circuits directly represent binary data without further logic operations in the four-phase case particularly.

9 Claims, 2 Drawing Figures

DIGITAL DEMODULATOR FOR DIFFERENTIALLY ENCODED PHASE-SHIFT-KEYED DATA

FIELD OF THE INVENTION

This invention relates to demodulators in data transmissions systems, particularly to demodulators for phase-shift-keyed data transmission systems.

CROSS REFERENCE TO RELATED APPLICATIONS

This application is related to two U.S. patent applications by R. J. Peck bearing Ser. Nos. 626,657 and 626.658 respectively entitled "Digital Modulator" and entitled "Digital Timing Recovery", both filed of even date herewith.

BACKGROUND OF THE INVENTION

Digital data transmission systems employing differentially encoded phase-shift keying (PSK) are well known in the art. Present day PSK systems generally employ hybrid arrangements of digital and analog circuit components. With the advent of relatively low-cost integrated circuit elements it has become possible to accomplish modulating and demodulating functions in data transmission apparatus with greater reliability and precision than with analog elements known to the prior art.

In differentially encoded PSK data transmission systems, as the name implies, data bits (taken one, two or more at a time) are represented by discrete phase differences measured between succeeding baud or symbol intervals. Decoding is then accomplished broadly by storing or delaying the absolute phases of received signals between baud intervals and subtracting the delayed phase from the present phase. The comparison between succeeding discrete phases can also be accomplished by correlating polarity samples of the received signal with those of a replica of itself delayed by an amount comparable to a baud interval. The latter correlation detection arrangement has been found to be highly adaptable to digital implementation. However, the signal-processing logic arrangements heretofore proposed have been unduly complex and generally have involved pluralities of up-down counters, auxiliary shift registers and digital logic circuits.

It is accordingly an object of this invention to provide an improved digital demodulator for PSK data signals.

It is another object of this invention to simplify the signal processing required with digital demodulators for PSK data signals employing correlation detection.

SUMMARY OF THE INVENTION

In accordance with this invention, a demodulator for differentially coherent PSK data signals comprises an amplitude limiter for squaring up received data signals, a shift register for serially storing periodic samples taken at a rate higher than the baud rate of the squared data signals, a pair of correlators for the instantly received signals and delayed replicas thereof, a unidirectional counter driven by each correlator and having at least one predetermined threshold-count level, and a bistable circuit responsive to each counter.

In a digital demodulator for an illustrative four-phase differentially encoded PSK data transmission system, wherein serial data are encoded in dibit-pairs on each of the discrete phase changes of $90m$ electrical degrees, where $m = 0,1,2$ and 3, i.e., zero degrees, $+90$ degrees, 180 degrees and 270 ($-90$) degrees, encoding dibits 00, 01, 11 and 10 respectively, a sampling rate is selected so that each half-cycle of the carrier wave is sampled at least four times and preferably several times that number to reduce quantizing error and thus to insure adequate noise performance. Correlations are made between the instant input sample and samples delayed by one baud interval plus and minus $\pi/4$ radians or 45 electrical degrees. Thus correlations are made between the instant input and delayed samples relatively delayed by 90° of the carrier wave. Exclusive-OR gates readily serve as correlators.

The illustrative embodiment contemplates data transmission within the telephone voiceband (approximately 300 to 3000 Hz) at a baud rate of 600 on a carrier wave at a frequency of 1200 Hz for an effective binary data rate of 1200 bits per second (one dibit per baud interval). The counter thresholds are established at or somewhat above half the sampling count corresponding to the baud interval. A dibit coding scheme is selected such that a count above the counter threshold indicates that a "one" or marking bit was transmitted and a count below the threshold within a baud interval indicates that a "zero" or spacing bit was transmitted. The state of each counter, i.e., above or below threshold, is transferred to a bistable flip-flop at the end of each baud interval and each counter is reset. Finally, the state of one flip-flop is transferred to the other, whereby the two flip-flops act as parallel-to-serial converters. A baud-rate clock controls the transfers from counters to flip-flops and as well the resetting of the counters.

The principle of this inventjion can readily be extended to higher-level PSK systems. The establishment of additional counter thresholds and the provision of appropriate logic circuitry controlled by such additional thresholds then becomes straightforward.

BRIEF DESCRIPTION OF THE DRAWING

The objects and features of this invention will become more apparent from a consideration of the following detailed description and the drawing in which.

DESCRIPTION OF THE ILLUSTRATIVE EMBODIMENT

Figure 2:
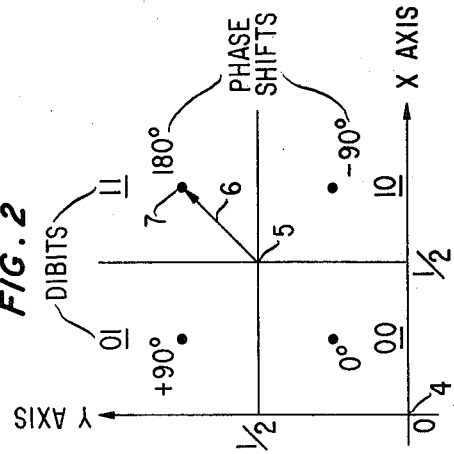
FIG. 2 is vector diagram useful in explaining the principle of this invention.

Turning first to FIG. 2 of the drawing, one observes a set of rectangular X- and Y-coordinates with a polar diagram superimposed thereon. If a vector 6 representing the relative phase of a carrier wave is assumed to be centered at point 5, having rectangular coordinates (½, ½), then the vector during the center portion of a given signaling baud interval can rest at one of the four points, such as 7, centered in the four quadrants drawn about point 5. The four points are further identified by the discrete phase changes of zero, ±90° and 180° represented thereby. The coordinates (½, ½) of point 5 represent the normalized values of half the total count corresponding to a baud interval. Thus, if a sampling rate of 256 times per baud interval is chosen, there are 256 counts per baud interval and ½ corresponds to a count of 128. These coordinates then are the threshold counts for the correlation counters.

If the carrier waves for succeeding baud intervals are in phase and these waves are relatively delayed by one baud interval, there will be total correlation and a counter will register zero, assuming no noise in the system and conventional exclusive-OR operation with no correlator output on matching samples. If further these in-phase carrier waves are respectively advanced and retarded by 45°, then it is apparent that correlation will be attained on three-fourths of the counts assigned to each baud interval and both correlation counters will fail to exceed the one-half count (128) threshold. The data decoded will accordingly be the dibit pair 00, as diagrammed in quadrant III of FIG. 2.

If the carrier waves for succeeding baud intervals are in opposite phase and correlations are taken with 45° advancements and retardations, correlation will be attained for only one-fourth the assigned counts in both cases and both associated counters will exceed the threshold. Accordingly, the data decoded will be the dibit pair 11 (quadrant I of FIG. 2).

If the carrier waves in succeeding baud intervals differ in phase by plus or minus 90° and correlations are taken with the prior wave advanced and retarded as before by 45°, it can be shown that the respective correlations will occur during either one quarter or three-quarters of the baud interval. In the +90° phasechange case the X-correlation will be below the threshold count and the Y-correlation, above the threshold count. In the −90° phase-change case the X-correlation will be above the threshold count and the Y-correlation, below the threshold count. Thus the +90° and −90° correlations decode the dibit pairs 01 and 10, respectively, as shown in quadrants II and IV of FIG. 2.

Under the plan outlined above, the four dibit phase codes can be recognized with only two up-counters in contrast to the prior art, which required a reversible averaging counter for each of the four dibit pairs.

It is apparent that this principle can be extended to eight-phase (and even higher orders cases where signal-to-noise ratios of the transmission medium permit) PSK encoding (three bits per baud interval). In eight-phase PSK systems eight allowable phase changes are assigned. Four of these phases are identical to the four-phase case illustrated in FIG. 2. The additional four phases are parallel to the X- and Y- axes. Thus, the additional phase vectors extend beyond the tips of the four-phase vectors and thus can be distinguished by threshold counts established at approximately one-eighth and seven-eighths the maximum counts to determine the nature of a third bit in each baud interval. A third flip-flop can be provided to monitor the crossings of the added thresholds.

Figure 1:
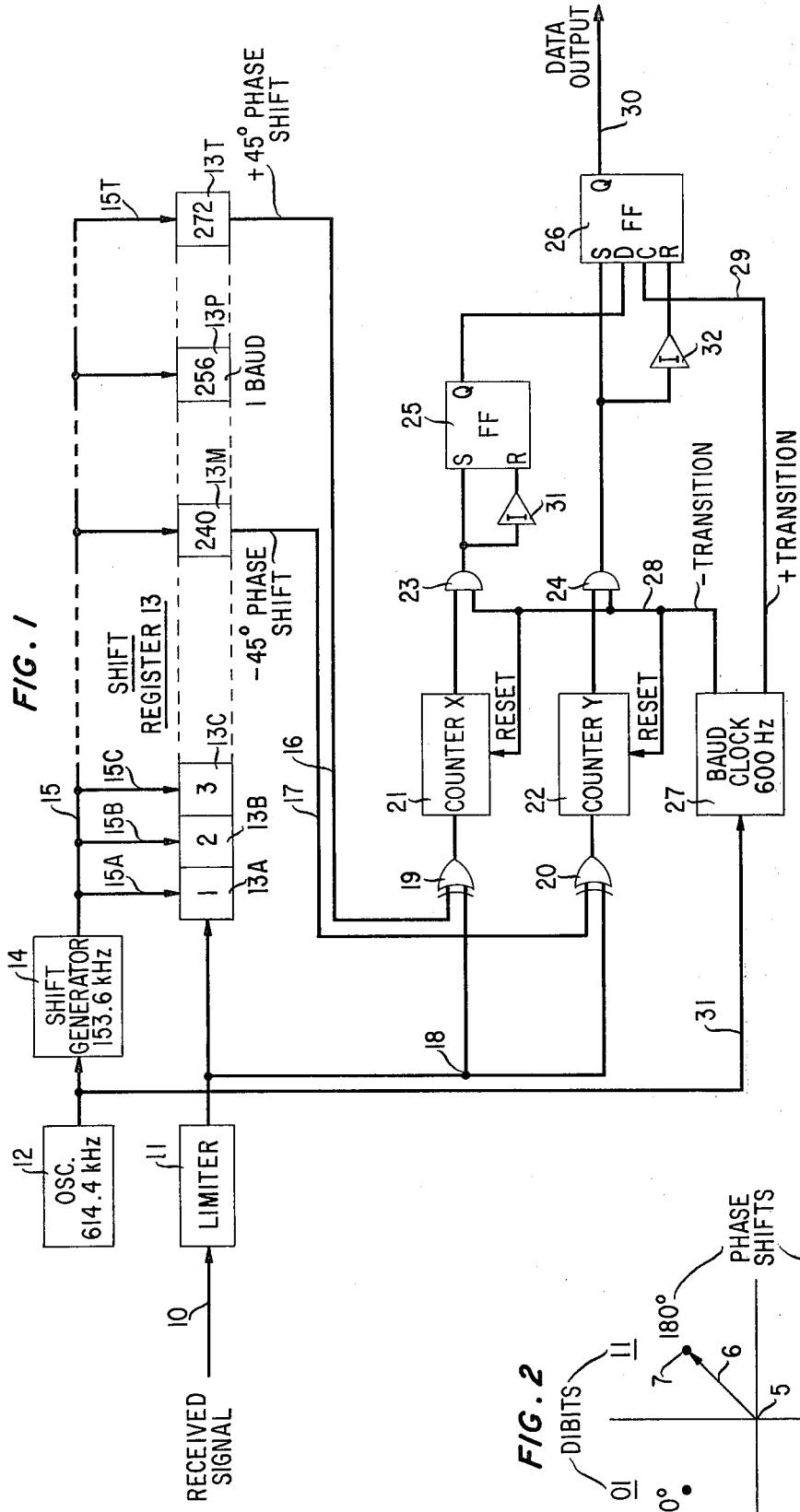
FIG. 1 is a block diagram of an embodiment for digital demodulation of a differentially encoded four-phase PSK data signal in accordance with this invention.

FIG. 1 is a block diagram of an illustrative four-phase PSK demodulator employing the principles of this invention. The demodulator comprises amplitude limiter 11, multistage shift register 13, high-speed shift generator 14 which also provides the sampling function, exclusive-OR gates 19 and 20, respectively, correlating the present signal sample with that delayed by one baud interval plus 45 degrees of carrier phase and that delayed by one baud interval less 45 degrees of carrier phase, resettable upcounting counters 21 and 22, AND-gates 23 and 24, flip-flops 25 and 26 and baud clock 27. Oscillator 12 provides a frequency source at an illustrative frequency of 614.4 kHz, which can be divided down to the shift rate of 153.6 kHz (4th subharmonic) and the baud rate of 600 Hz (1024th subharmonic).

The exact manner in which baud clock 27 is synchronized is not pertinent to this invention. Suffice it to say that conventional synchronization methods are available based on monitoring zero crossings in, or the envelope of, the received signals. In addition, the cited U.S. Patent application of R. J. Peck bearing Ser. No. 626,658 and entitled "Digital Timing Recovery" discloses a novel timing recovery system using additional taps on the same multistage shift register as does this invention.

In FIG. 2 the received signal on input line 10 is a constant frequency wave characterized by discrete phase changes in successive baud intervals, except where consecutive 00 dibits are transmitted. This signal is hard-limited so that only polarity and zero-crossing times remain as observable parameters in limiter 11, which can advantageously comprise an amplifier and positive and negative clippers. The squared output from limiter 11 is connected to multistage shift register 13 and junction 18 for exclusive-OR gates 19 and 20. Shift generator 14 is preferably driven by oscillator 12, which can be phaselocked to incoming signal transitions. The illustrative shifting frequency of 153.6 kHz derived by appropriate frequency division from oscillator 12 is selected to provide 256 samples of the received signal wave during each baud interval. This is equivalent to taking 64 samples during each half-cycle of the 1200 Hz carrier wave, or 16 samples for each 45° of carrier phase, provided no frequency offset occurs.

Shift register 13 is a multistage shift register advantageously having 272 stages. At the shifting rate of 153.6 kHz, 256 samples from each baud interval are simultaneously available. Since 45° of 1200 Hz carrier phase shift corresponds to sixteen samples, shift register 13 is extended to 272 stages so that the time difference between the input to stage 13A and the output of stage 13T corresponds to one baud interval plus $\pi/4$ radians or 45° of carrier phase. Stage 13M provides an output at the 240th sample, which corresponds in time to one baud interval less $\pi/4$ radians measured from the input to stage 13A. In another view stages 13M and 13T are separated by 90° of carrier phase from each other. Leads 16 and 17 are respectively connected to stages 13T and 13M. The contents of the respective stages are shifted to the right one stage at a time under control of the 153.6 kHz pulses on shift lead 15 which has a parallel branch, such as 15A and 15T shown, to each stage of shift register 13 for simultaneous shifting of all stages.

The received signal after limiting appears at junction 18 and is applied to one input of each of exclusive-OR gates 19 and 20. Exclusive-OR gates operate to produce complementary outputs, as is well known, in response to whether their binary inputs are alike or different. For this description it is assumed that when both inputs are different, the output is high. Otherwise, the output is low. The remaining inputs of gates 19 and 20 are connected to respective leads 16 and 17. Accordingly, the output of gate 19 is high when the received signal sample at the input of shift register stage 13A is complementary to that at the output of 272nd stage 13T, i.e., there is a failure of correlation between the present received signal sample and that received one baud interval and 45° of carrier phase previously. Similarly, the output of gate 20 goes high when there is a failure of correlation between the present received signal sample and that received one baud interval less 45° of carrier phase previously. For instantaneous correlation the outputs of gates 19 and 20 remain low.

The outputs of exclusive-OR gates 19 and 20 are applied respectively to counters 21 and 22 are shown. Each time one of these outputs goes high another count is registered in the respective X and Y counters 21 and 22. At least one preassigned threshold count level is built into the counter so that when the appropriate level is reached the counter changes its output state. In the illustrative embodiment this threshold, in order to provide a margin against noise, is set at not less half the full count level, namely: 128. Crossing of the threshold is communicated to coincidence AND-gates 23 and 24, whose other inputs are controlled by an output of baud clock 27 on lead 28. The activation of lead 28 also resets counters 21 and 22 to signal the beginning of another baud interval.

Baud clock 27 under the control of oscillator 12 by way of lead 31 provides two outputs at the 600-Hz baud interval. The outputs on leads 28 and 29 are interleaved so that the output on lead 28 marks the beginning of the baud interval and that on lead 29, the center of the baud interval.

The outputs of AND-gates 23 and 24 control the states of bistable flip-flops 25 and 26. D-type flip-flops are illustrated. This type of flip-flop displays complementary outputs Q and $\overline{Q}$ responsive to activation of set (S) and reset (R) inputs independently of any clock input. The D flip-flop is also provided with a clock (C) input and a data (D) input. The outputs Q and $\overline{Q}$ follow the state of the D input only when the clock input is simultaneously applied. In the present embodiment the $\overline{Q}$ outputs are not used in either flip-flop and the C and D inputs are used only on flip-flop 26. The S inputs are directly controlled by the outputs of AND-gates 23 and 24. The R inputs are controlled by outputs of AND-gates 23 and 24 after inversion in inverters 31 and 32. Thus, when the output of AND-gate 23 goes high, flip-flop 25 is set and output Q goes high. When the output of AND-gate 23 goes low, that output is inverted in inverter 31 and flip-flop 25 is reset so that output Q goes low.

Flip-flop 26 displays a high or low Q output in response to the output of AND-gate 24 in the first half of the baud interval. In the second half of the baud interval the Q output is high or low in accordance with the output of flip-flop 25 in coincidence with the clock pulse at input C from lead 29. The Q output of flip-flop 25 is connected directly to the D input of flip-flop 26. Thus, flip-flop 26 acts both to decode the count in Y-counter 22 and to act as a parallel-to-series converter for the count in X-counter 23. Accordingly, the Q output of flip-flop 26 on lead 30 is the decoded serial binary data without further logic processing.

While this invention has been described by way of a particular embodiment employing a stated baud rate and carrier frequency, it will be apparent to one skilled in the art that its principle is susceptible of modification and extension to other baud rates and carrier frequencies within the spirit and scope of the following claims.

What is claimed is:

1. Apparatus for demodulating a received data signaling wave encoding data elements by phase differences between successive signaling intervals comprising:
   means for hard limiting said received wave to display polarity and zero crossings thereof only;
   shift register means having a plurality of stages for serially storing periodic samples of the output of said hard-limiting means extending over more than a signaling interval;
   means for comparing the instant sample of the received wave at the input of said shift register means with samples from the present and succeeding signaling interval stored therein,
   said comparing means generating complementary outputs corresponding to matches and mismatches respectively between compared samples;
   counting means responsive to outputs of said comparing means representing mismatches between pairs of compared samples and having preassigned threshold counts;
   bistable circuit means responsive to the attainment or not of threshold count levels by said counting means in each signaling interval, the output state of said bistable circuit means corresponding to decoded digital data; and
   means for resetting said counting means to a reference state at the beginning of each signaling interval.

2. Apparatus in accordance with claim 1 in which the encoding carrier phase differences are 90m electrical degrees, m being equal to 0, 1, 2 and 3; and the phase separation between the input sample to said shift register means and the previous samples compared is one baud interval plus and minus $\pi/4$ radians of the received wave.

3. Apparatus in accordance with claim 1 in which said comparing means comprise exclusive-OR gates having a first output state when input signals are alike and a second complementary output state when input signals are mutually complementary.

4. Apparatus in accordance with claim 1 in which said counting means count in one direction only in response to one binary input state and are resettable to a reference condition in response to another binary input.

5. Apparatus in accordance with claim 1 in which the number of periodic samples taken for each signaling interval is n, and the threshold count level for each of said counting means is not less than n/2.

6. Apparatus in accordance with claim 1 in which the number of periodic samples taken for each signaling interval is 256 and the threshold count level for each of said counting means is not less than 128.

7. A demodulator for differentially phase encoded digital data comprising storage means for a plurality of samples of received digital data encoded on n phases of a carrier wave of a given frequency,
   first and second exclusive-OR means for correlating the input to said storage means with previous inputs separated by one baud interval plus and minus $\pi/n$ radians of said carrier wave to provide first and second bivalued correlation signals,
   first and second resettable counter means responsive to said first and second correlation signals respectively and having preassigned threshold output count levels,
   first and second bistable circuit means, and
   means for gating the count-up state of said first and second counting means respectively to said first and second bistable circuit means at baud intervals to indicate whether or not the preassigned thresholds of said counter means have been crossed and for thereafter resetting said counter means to a reference condition, the resultant states of said bistable means representing decoded digital data.

8. The demodulator defined in claim 7 in which digital data are encoded on four discrete phases of said carrier wave separated by 90 electrical degrees, said storage means is a multistage shift register storing samples separated by at least one baud interval plus and minus 45 electrical degrees, said first exclusive-OR gate compares a signal sample entering said storage means with another signal sample received one baud interval and 45 electrical degrees previously, and said second exclusive-OR gate compares a signal sample entering said storage means with another signal sample received one baud interval less 45 electrical degrees previously.

9. The demodulator defined in claim 7 in which each discrete carrier phase difference between succeeding baud intervals encodes two binary digits and the output states of said bistable circuit means corresponds to respective ones of said binary digits.

* * * * *